United States Patent [19]
Nielsen et al.

[11] Patent Number: 6,147,684
[45] Date of Patent: Nov. 14, 2000

[54] TECHNIQUES FOR NAVIGATING LAYERS OF A USER INTERFACE

[75] Inventors: Jakob Nielsen, Atherton; B J Fogg, Stanford, both of Calif.

[73] Assignee: Sun Microysytems, Inc., Palo Alto, Calif.

[21] Appl. No.: 09/019,800

[22] Filed: Feb. 6, 1998

[51] Int. Cl.⁷ ....................................................... G06F 3/14
[52] U.S. Cl. .......................... 345/344; 345/340; 345/345; 345/145; 345/342
[58] Field of Search ................... 345/344, 345, 345/145, 342, 473, 340

[56] References Cited

U.S. PATENT DOCUMENTS

| | | | |
|---|---|---|---|
| 4,868,765 | 9/1989 | Diefendorff | 345/345 |
| 5,050,105 | 9/1991 | Peters | 345/340 |
| 5,179,655 | 1/1993 | Noguchi et al. | 345/345 |
| 5,430,839 | 7/1995 | Jagannathan et al. | 345/345 |
| 5,581,670 | 12/1996 | Bier et al. | 345/146 |
| 5,590,265 | 12/1996 | Nakazawa | 345/340 |
| 5,617,144 | 4/1997 | Lee | 348/416 |
| 5,668,962 | 9/1997 | Kitami | 345/340 |
| 5,689,666 | 11/1997 | Berquist et al. | 345/345 |
| 5,835,088 | 11/1998 | Jaaskelainen | 345/340 |
| 5,892,511 | 4/1999 | Gelsinger | 345/340 |

OTHER PUBLICATIONS

Paul McFedries, Windows 95 Unleashed, "95 Hotest Software Utilities!", 1996.

*Primary Examiner*—Raymond J. Bayerl
*Assistant Examiner*—Thomas T. Nguyen
*Attorney, Agent, or Firm*—McDermott, Will & Emery

[57] ABSTRACT

A graphical user interface permits navigating through a plurality of stacked window layers or image planes. In one form, moving through one image plane to an image plane below simulates pressing on an elastic membrane until it bursts. In another form, worm holes are used to access selected layers at different depths. In another embodiment, a property analogous to thickness, is associated with an image plane and the amount of time or force required to pass through the image plane is controlled as a function of thickness. In yet another form, a force feedback input/output device having three degrees of freedom is used to give a user the feel of physically penetrating through plural stacked layers.

28 Claims, 15 Drawing Sheets

TECHNIQUES FOR NAVIGATING LAYERS OF A USER INTERFACE

CROSS REFERENCE TO RELATED APPLICATIONS

This application is related to U.S. patent application Ser. No. 08/932,239 filed Sep. 17, 1997 entitled "INVISIBLE AND ONE PIXEL SCROLL BARS" by Jakob Nielsen which is hereby incorporated by reference herein in its entirety.

BACKGROUND OF THE INVENTION

1. Field of the Invention

The invention relates to computer systems and software and, more particularly, to a graphical user interface for navigating through multiple overlapping window layers and especially through multiple overlapping translucent window layers.

2. Description of Related Art

User interfaces are known which permit windows to overlap. Users can navigate among window layers in various ways such as clicking on an edge of a partially hidden window, using a menu command to cycle through window layers and using drop down menus to bring windows to the front. Typically, in order to be able to click on an exposed edge of a window, windows are arranged in an overlapping tile arrangement so that a window can be brought forward by positioning a cursor controlled by a mouse over an edge of the window visible in the tiling arrangement and then clicking the mouse.

The Problems

Software applications are becoming more complex, but at the same time, specialized computer devices are becoming smaller. These trends combine to create a problem, namely not enough screen real estate. This problem is relevant not only to the hand held interactive technologies, but also for any technology that uses a visual display of limited size, such as a cellular telephone, a digital watch or a web kiosk, for example.

The related patent application explained the concept of using one overlapping translucent layer in a user interface. However, a need arises for navigating through one or more translucent layers or through numerous overlapping layers in order to access functionality available only on specific layers.

In certain applications, such as geophysical mapping, it is highly desirable to represent multiple image planes of information simultaneously to a user. At the same time, it is desirable to be able to access and view the individual image planes.

The prior art techniques described above each have their disadvantages. If windows are tiled, screen real estate is consumed unnecessarily. If a menu command is utilized, multiple steps are required to be able to access the menu and then cycle through the layers.

SUMMARY OF THE INVENTION

The invention relates to methods, apparatus, systems and computer program products which allow for navigation through overlapping layers of a user interface and particularly to the navigation through one or more translucent layers. In one embodiment, a cursor is located over a non-reactive portion of a window layer and a mouse click or some other command moves the top window layer to the bottom of the stack of overlapping windows. In a second embodiment, while a cycle function is activated, such as by holding a mouse button down, cycling to the next window layer occurs at a rate which increases the longer the mouse button is held down. In this way, the number of layers per second through which a graphical user interface navigates accelerates while the mouse button is down. A user has the ability to set both the rate of acceleration and a maximum instantaneous speed of cycling through layers.

In another embodiment, window layers are given a property analogous to "thickness." At least one of the time required or the force required to navigate through a thick layer is more than that required to navigate through a thin layer. In a preferred form of the invention, each layer is treated as a membrane which has an appearance of being distorted as the user attempts to punch through to a layer underneath the top membrane layer. In some embodiments, a sound accompanies the penetration of membrane layers with the property of the sound changing as the break point for the membrane approaches. In some forms of the invention, tactile feedback experienced by a user as the user penetrates a membrane layer changes as well. In another embodiment of the invention, worm holes are provided at various locations in the uppermost layer to permit quick access to various layers of a multilayer stack which are below the uppermost layer. In another form of the invention, the penetration time for a particular membrane layer is adjusted as a function of both the force applied by a user and the thickness property of that membrane layer.

The foregoing and other features, aspects and advantages of the present invention will become more apparent from the following detailed description of the present invention when taken in conjunction with the accompanying drawings.

BRIEF DESCRIPTION OF DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENTS

Figure 1A:
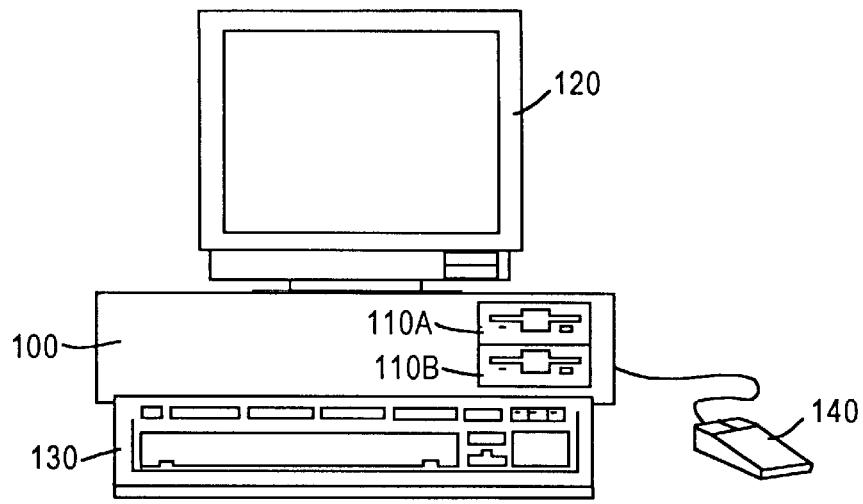
FIG. 1A is an illustration of a computer of a type suitable for carrying out the invention.

FIG. 1A illustrates a computer of a type suitable for carrying out the invention. Viewed externally in FIG. 1A, a computer system has a central processing unit 100 having disk drives 110A and 110B. Disk drive indications 110A and 110B are merely symbolic of a number of disk drives which might be accommodated by the computer system. Typically, these would include a floppy disk drive such as 110A, a hard disk drive (not shown externally) and a CD ROM drive indicated by slot 110B. The number and type of drives varies, typically, with different computer configurations. The computer has the display 120 upon which information is displayed. A keyboard 130 and a mouse 140 are typically also available as input devices. Preferably, the computer illustrated in FIG. 1A is a SPARC workstation from Sun Microsystems, Inc.

Figure 1B:
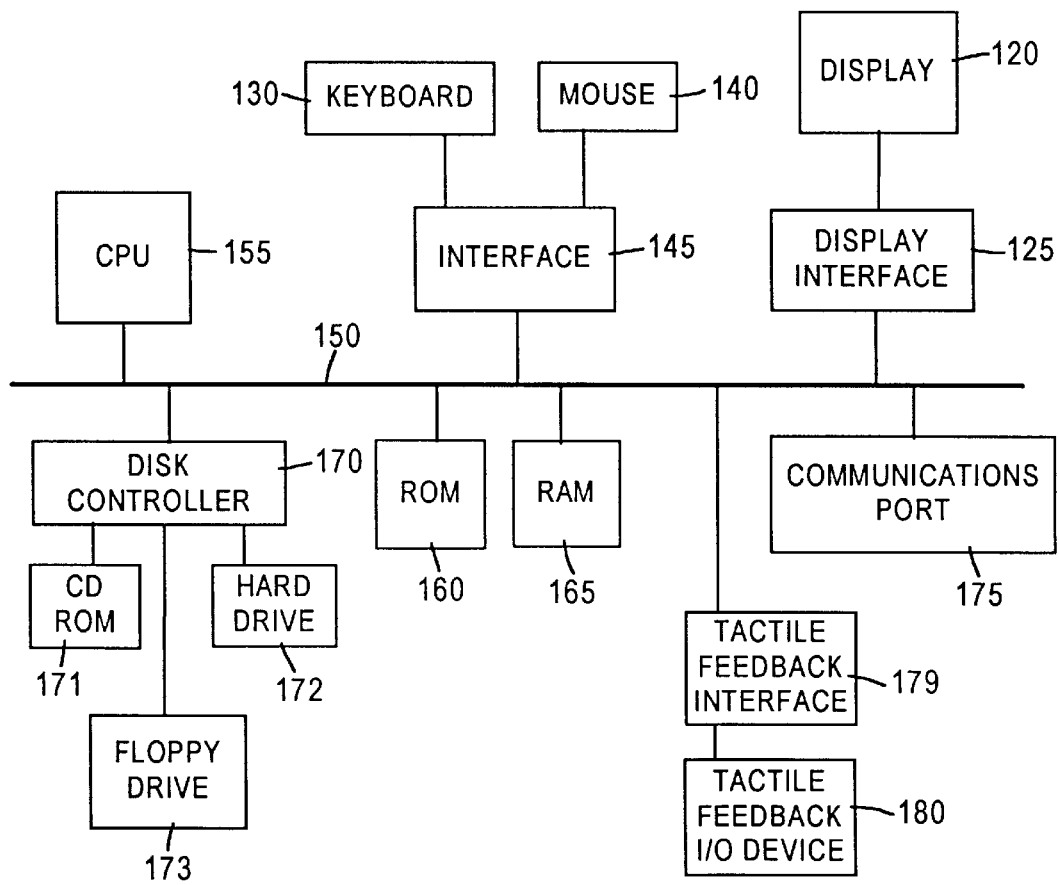
FIG. 1B is a block diagram of an exemplary bus architecture suitable for carrying out the invention.

FIG. 1B illustrates a block diagram of the internal hardware of the computer of FIG. 1A. A bus 150 serves as the main information highway interconnecting the other components of the computer. CPU 155 is the central processing unit of the system, performing calculations and logic operations required to execute programs. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. A display interface 125 interfaces a display 120 and permits information from the bus to be viewed on the display. Communications with external devices can occur over communications port 175. A tactile feedback input/output device 180 is interfaced to bus 150 over a tactile feedback interface 179.

Figure 1C:
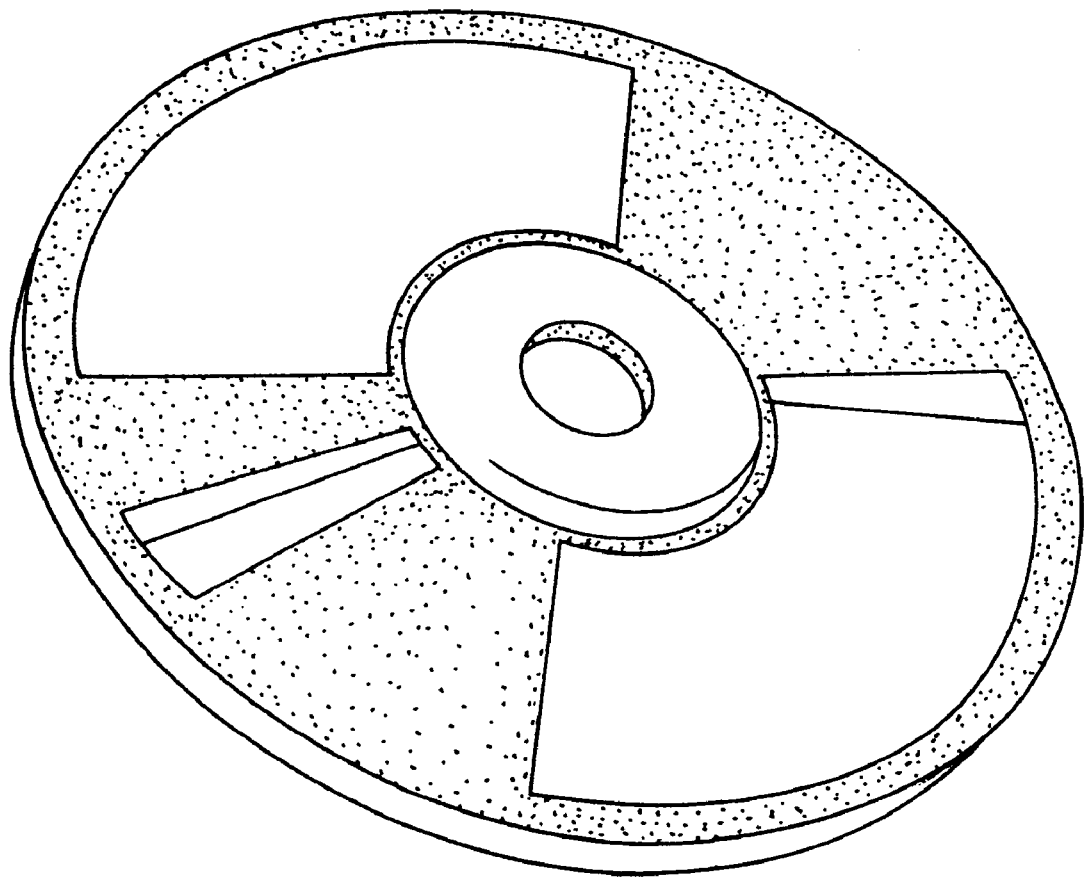
FIG. 1C is an illustration of an exemplary memory medium for carrying program information and data for use in carrying out the invention.

FIG. 1C illustrates an exemplary memory medium which can be used with drives such as 173 in FIG. 1B or 110A in FIG. 1A. Typically, memory media such as a floppy disk, or a CD ROM, or a Digital Video Disk will contain the program information for controlling the computer to enable the computer to perform its functions in accordance with the invention. Program and data information from such media may be transmitted, in accordance with the invention, over a transmission link in the form of a carrier wave.

Figure 1D:
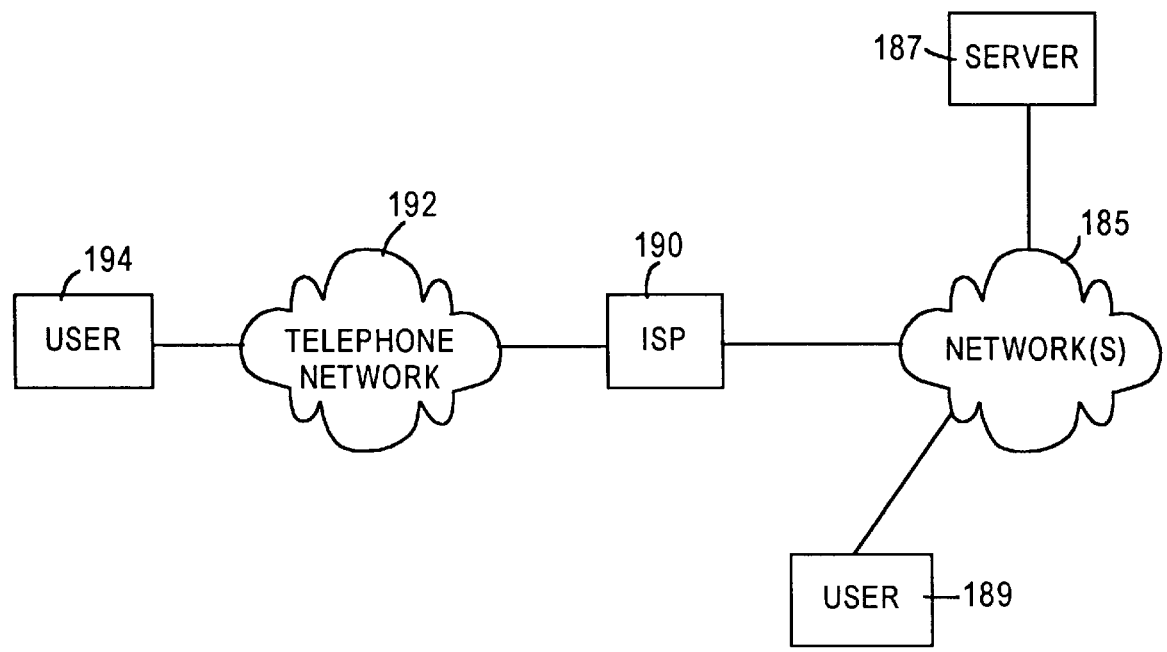
FIG. 1D is a block diagram of an exemplary network suitable for carrying program and data information useful for carrying out the invention.

FIG. 1D illustrates the use of computers of the type shown in FIGS. 1A and 1B in a network environment. Such computers can be used as user computers (194, 189) or as servers (187), sometimes with nominal differences of configuration. A user computer may connect to the network 185 either directly (189) or via a network service provider, such as an internet service provider 190. Program and data information used in carrying out the invention can be transmitted as a carrier wave over the network(s).

Figure 1E:
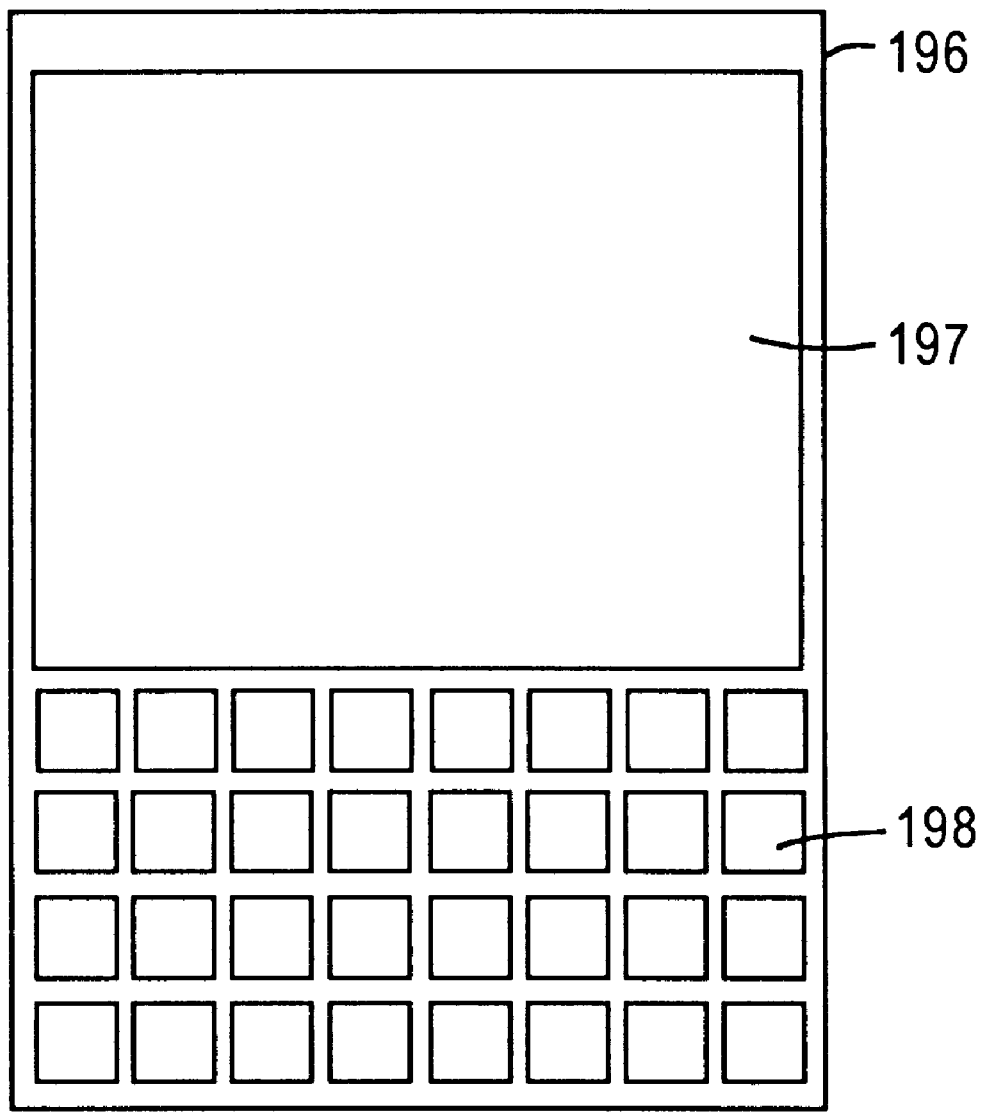
FIG. 1E is a front view of a portable device in which embodiments of the invention may be usefully employed.

FIG. 1E is a front view of a portable device in which embodiments of the invention may be usefully employed. Device 196 may take the form of any number of consumer devices such as, for example, a watch, a calculator, a portable phone or a personal digital assistant. Common to each of these is a screen area 197 having a limited size. A variety of keys, such as 198, are commonly provided to input data. In lieu of or in addition to such keys, a stylus is sometimes utilized when the display screen 197 is pressure sensitive. When utilized with this type of device, one of the keys 198 may be utilized to initiate cycling through layers or alternatively, a stylus, touch pad or touch sensitive screen can be utilized in a way analogous to a cursor controlled by a mouse for activating navigation through plural overlapped window layers.

Figure 2:
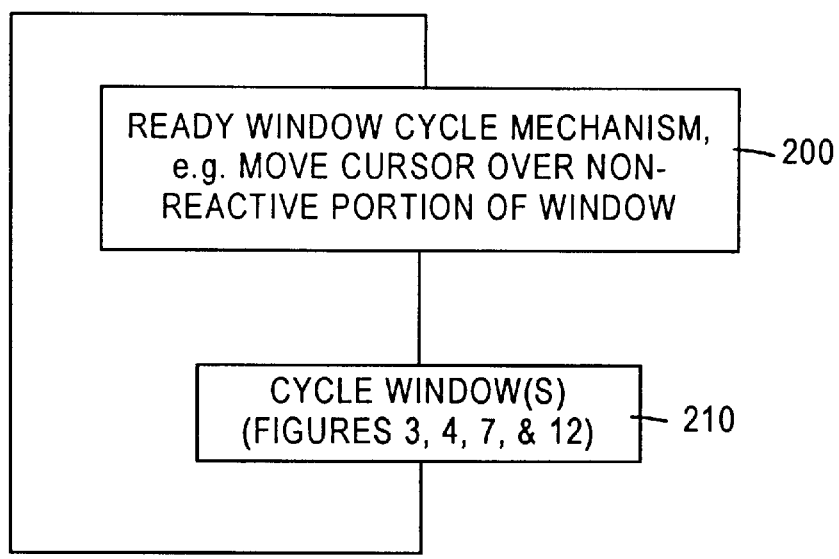
FIG. 2 is a flow chart of a high level exemplary process for carrying out the invention.

FIG. 2 is a flow chart of a high level exemplary process for carrying out the invention. At a high level, a user readies the window cycling mechanism (200) such as by moving a cursor over a non-reactive portion of the window layer being displayed. The actual cycling of the window layers or image planes occurs (210) in a number of different ways, illustrated in exemplary fashion in conjunction with FIGS. 3, 4, 7 and 12.

Figure 3:
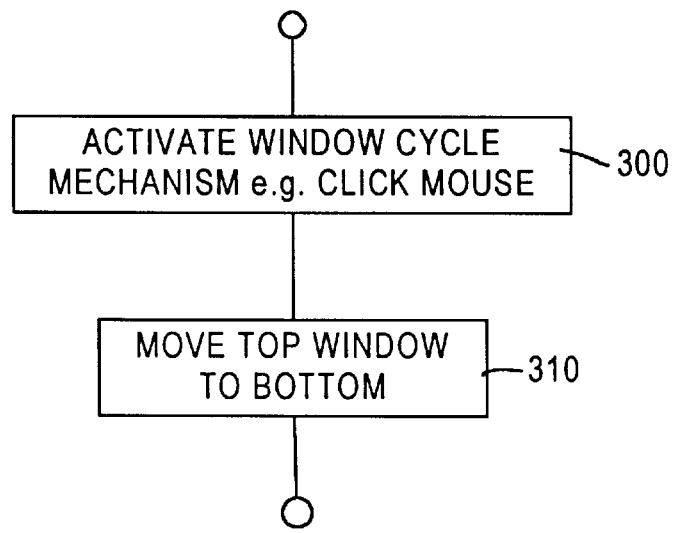
FIG. 3 is a flow chart of one embodiment of an exemplary process for cycling through overlapping window layers.

FIG. 3 is a flow chart of an exemplary process for cycling through overlapping window layers in accordance with one embodiment of the invention. This may be the simplest form of implementing the invention. When the cursor is positioned over a non-reactive portion of the screen, namely a portion of the screen which would otherwise not invoke functionality, a mouse click or other command will be interpreted as a request to move the top window to the bottom and display and activate the next layer down in a stack of multiple superimposed window layers or image planes (310) in order to access functionality of that layer.

Figure 4:
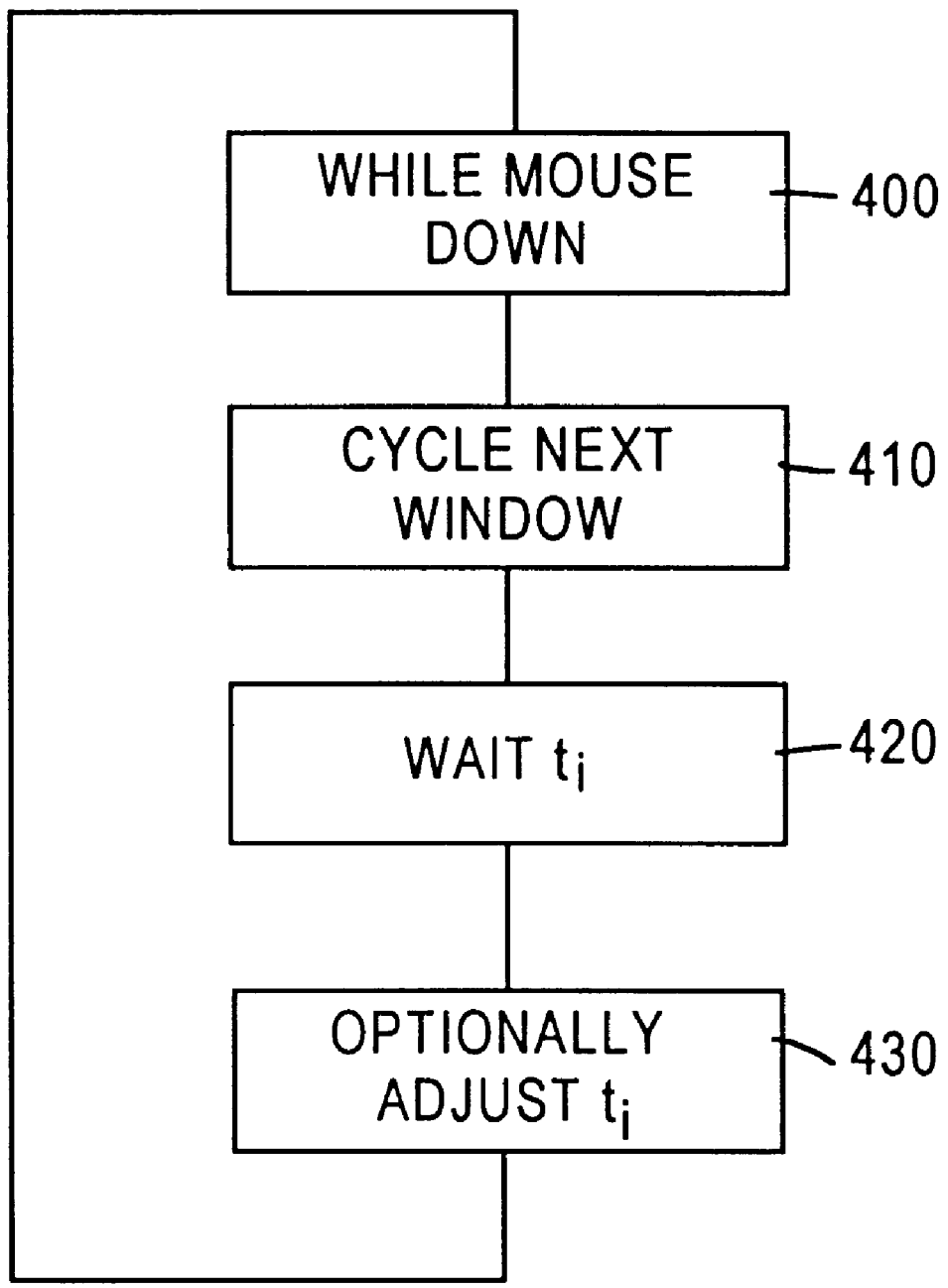
FIG. 4 is a flow chart of a second embodiment of an exemplary process for cycling through overlapping window layers.

FIG. 4 is a flow chart of an exemplary process for cycling through overlapping window layers in accordance with a second embodiment of the invention. This particular process is useful when there are large number of stacked window layers or image planes. While a mouse button is held down (400), cycling to the next window layer will occur (410). A certain amount of delay (420) is useful in giving a user time to identify that the user has reached a layer which is desired. However, one may optionally adjust the wait time $T_i$ (430) so that the longer the mouse button is held down, the faster the recycling time will be. This permits the process of cycling through window layers to accelerate as a function of how long the mouse button is held down to permit rapid movement through a large number of otherwise irrelevant window layers.

Figure 5:
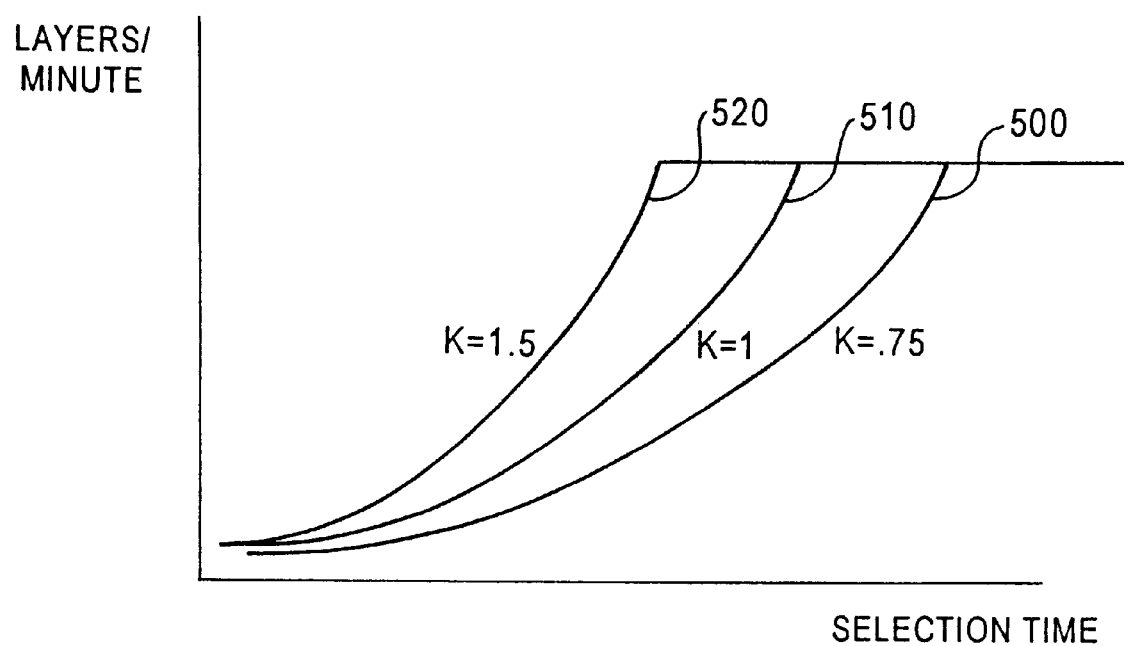
FIG. 5 is a graph with exemplary members of a family of curves useful in explaining how a user or process may adjust cycling time for sequencing overlapping window layers as well as adjusting a rate of acceleration of cycling time.

FIG. 5 is a graph with exemplary members of a family of curves useful in explaining how a user or process may adjust cycling time for sequencing through overlapping window layers as well as controlling a rate of acceleration of cycling time. The layers per minute shown in the ordinate of this graph, is a function of both a user set parameter K as well as a function of a variable T which is a measure of amount of time that, in the example shown, the mouse button is held down. In other words:

$$layers/minutes = f(KT) \quad (1)$$

In the example above, the function of KT may be $KT^2$. If a user were to set a rate of acceleration to follow curve 500, a number of layers per minute would start out very slowly. But, the longer the mouse was held down, the number of layers per minute would increase along the curve 500 until some maximum value was reached. By selecting different members of the family of curves, by setting a value for the parameter K, a user can control the rate of acceleration to fit a user preference. This particular graph shows a continuous function for layers per minute. However, discreet functions may also be used. As shown in FIG. 4, each time a window is cycled, one may wish to adjust the time increment of the delay (430) by subtracting a discrete amount from the delay time $T_i$. This effectively results in a sequence of discrete delay increments which follow a curve such as those shown in FIG. 5 with the particular curve followed being a function of the value of the parameter K set by the user.

Figure 6:
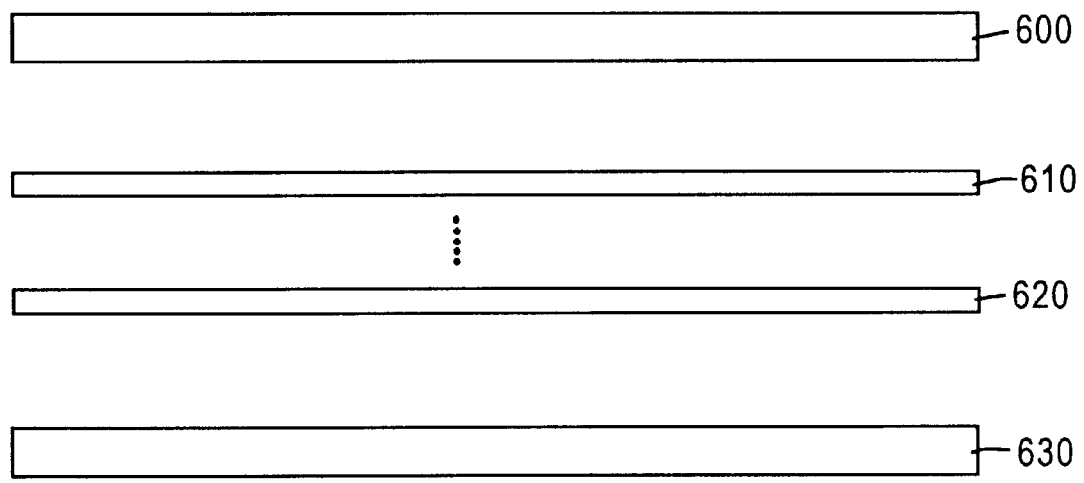
FIG. 6 is an illustration of multiple overlapping window layers with some layers having a different "thickness" property.

FIG. 6 is an illustration of multiple overlapping window layers or image planes with some window layers having a different "thickness" property. This is illustrated in FIG. 6 where window layers or image planes 600 and 630 are illustrated as having a greater "thickness" than window layers 610 and 620. This thickness is metaphorical. Image planes and window layers don't have "thickness" in any physical sense. However, by attributing a property to a window or image plane which is analogous to "thickness" several beneficial results can be achieved. First, as a matter of navigation, one can set the amount of time needed to pass through a window layer or image plane of a stack to a lower level to be a function of the "thickness" property. Thus, one may desire to spend more time considering certain image planes before passing to the next one. By attributing a property analogous to "thickness", one can control the delay. Further, as discussed more hereinafter, when using the membrane representation of image planes, the amount of "thickness" may affect the amount of force applied to an input output device in order to pass through an image plane.

Figure 7:
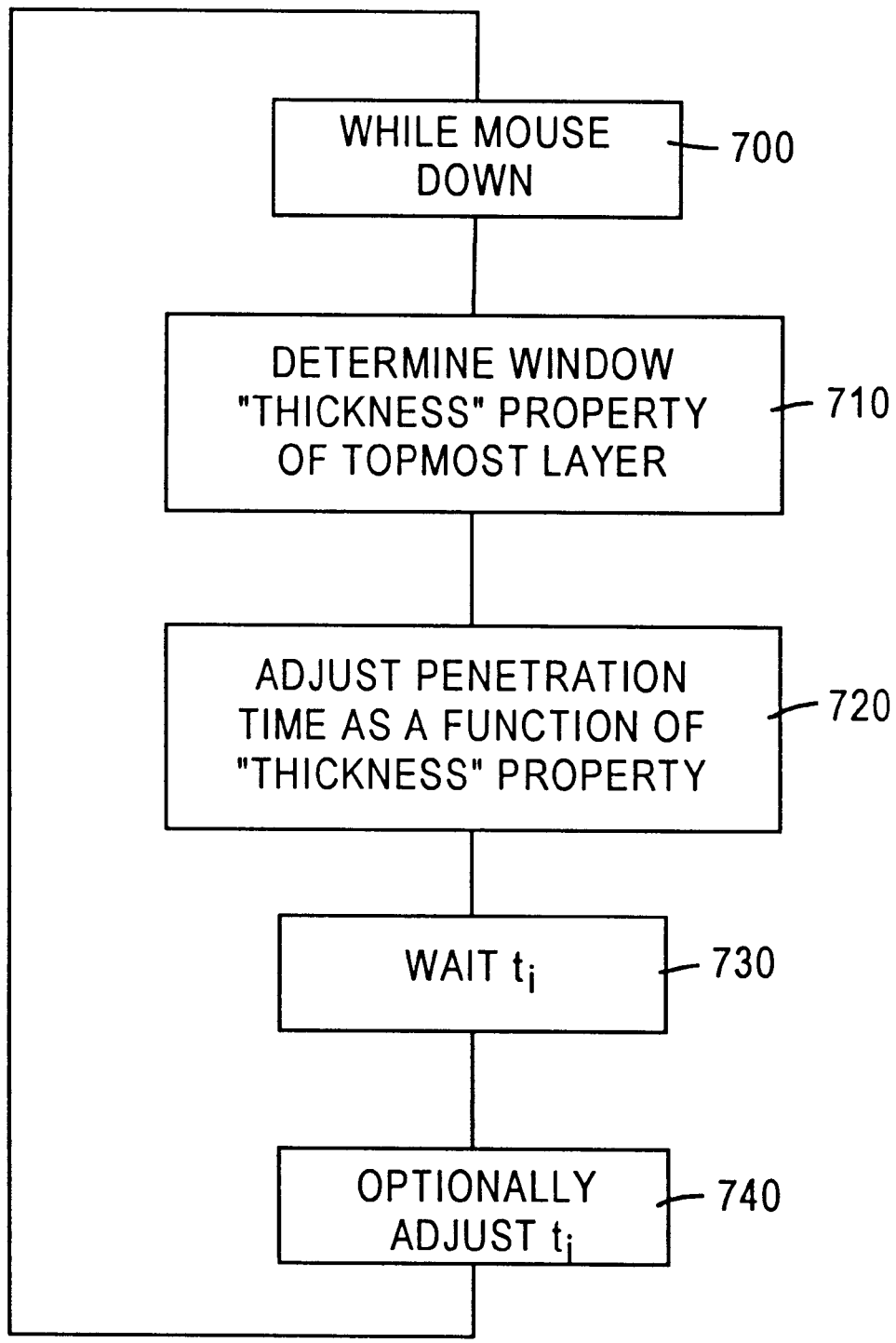
FIG. 7 is a flow chart of an exemplary process for cycling through window layers having different "thickness" properties.

FIG. 7 is a flow chart of an exemplary process for cycling through window layers having different "thickness" properties. As shown in FIG. 7, cycling is active, such as when indicated by mouse down (700), the "thickness" property of the topmost layer is determined (720). The time to "pass through" the layer (penetration time) is set as a function of the "thickness" property (720). Thus, certain layers will be emphasized on the screen by being displayed on the screen for a longer period of time prior to cycling to the next window layer. In this way, more important window layers or image planes can be distinguished from less important image planes.

Figure 8:
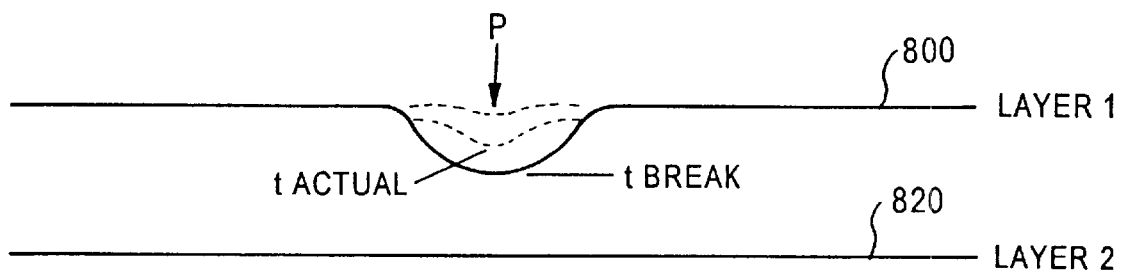
FIG. 8 is an illustration of a side view of two membranes as a top one is deformed to the breaking point, permitting access to a lower membrane.

FIG. 8 is an illustration of a side view of two membranes as a top one is deformed to the breaking point, permitting access to a lower membrane. FIG. 8 represents a physical model which serves as a metaphor for implementation of a membrane analog in a graphical user interface. If layer 1 (800) were an elastic membrane positioned parallel with and over a layer 2 (820), and if one were to begin pressing on the upper membrane at a point P, which in one implementation of the metaphor constitutes a cursor location, the membrane would deform as a function of the amount of displacement from the relaxed position to the stretched position. If $T_{actual}$ represents the deformation point at any particular point in time and $T_{break}$ indicates the point at which the membrane becomes stretched to the point of breaking, then there are a variety of intermediate states through which $T_{actual}$ passes from the undeformed state to the breaking state. This is analogous to pressing on the surface of a balloon with a pointed object. The surface begins to deform and as pressure is increased the elastic membrane deforms further until a breaking point is reached. At that point, the membrane breaks and, like a balloon popping, one is provided with access to the space beneath the elastic membrane which has broken.

Figure 9A:
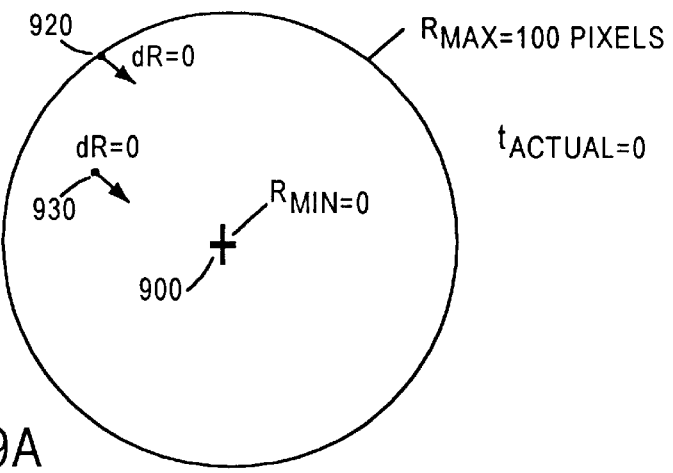
FIGS. 9A, 9B and 9C are each a top view of a membrane under 0, intermediate and maximum deformation prior to breaking, respectively.
Figure 9B:
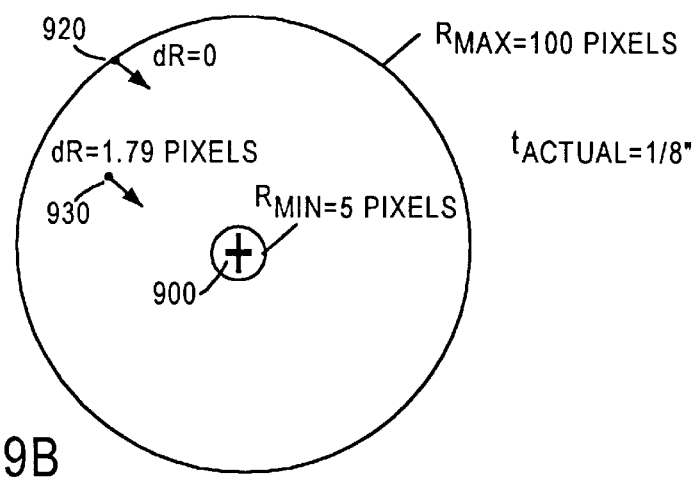
Figure 9C:
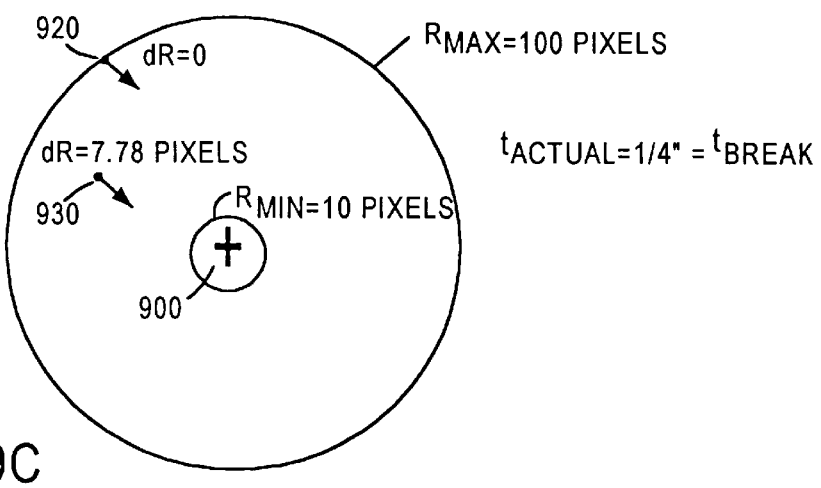

FIGS. 9A, 9B and 9C are each a top view of a membrane under 0, intermediate and maximum deformation prior to breaking, respectively. For purposes of implementing a computerized version of the elastic membrane metaphor, the point 900 represents the cursor location or the point at which pressure is applied to the elastic membrane. For ease and computation, one assumes that there is a maximum radius $R_{max}$ (910) beyond which the effect of any deformation at point 900 will not be significant or noticeable. Since this is implemented on a computer screen, the distortions in XY position on the screen resulting from deformation of an elastic membrane are simulated by moving the XY location of pixels toward the point 900 at varying degrees of deformation. In the example shown in FIG. 9A, there is no deformation at all and therefore no pixel displacement. Turning to FIG. 9B, an intermediate deformation is shown. In this example, $T_{actual}$ is assumed to be half way between no deformation and maximum deformation. If the maximum deformation achieved before breaking were a quarter of an inch, then $T_{actual}$ in FIG. 9B would be one-eighth of an inch (e.g. displacement of an input/output device along one direction or degree of freedom). All the pixels surrounding point 900 are displaced somewhat in the direction of point 900 as the membrane is deformed in implementing this model. This will give the appearance of stretching a membrane and drawing certain points originally on the unstretched membrane toward the point 900. In the process of making some transformation of this nature, pixels from the immediate neighborhood of point P, that is, pixels within the radius $R_{min}$ of a point 900 collapse onto the point itself when implementing this exemplary metaphor. Pixels between $R_{min}$ and $R_{max}$ are displaced proportionality with less displacement occurring closer to $R_{max}$ and more displacement occurring closer to $R_{min}$. Right at the breaking point, the number of pixels within $R_{min}$ have a maximum value. This can be a set parameter. Pixels within $R_{max}$ but outside of $R_{min}$, are displaced in an amount described hereinafter in the radial direction toward point 900. The values for $R_{min}$ and for the displacement of a pixel in between $R_{max}$ and $R_{min}$ are set forth in equations 2 and 3, respectively.

$$R_{\min} = dR_{\max}\left(\frac{t_{actual}}{t_{break}}\right) \quad (2)$$

$$dR = R_{\min} - R_{\min}\left(\frac{R_{pixel} - R_{\min}}{R_{\max} - R_{\min}}\right) \quad (3)$$

In these equations, there is a parameter $dR_{max}$ which is set either by a system or by a user. There are also a value $T_{break}$ and a value of $R_{max}$ which are parameters set the same way.

Two examples are now given showing the application of equations 2 and 3 for the calculation of pixel displacements at various distances of $R_{actual}$ given a certain deformation $T_{actual}$. These are as follows:

Assuming:

$dR_{max}$=10 pixels $t_{break}$=¼"

$R_{max}$-100 pixels

Example 1:

$t_{actual}$=1/16"

$R_{min}$=2.5 pixels

| $R_{actual}$ | dR |
|---|---|
| $R_{min}$ | $R_{min}$ |
| $R_{max}$ | 0 |
| 30 pixels | 1.79 pixels |

Example 2:

$t_{actual}$=¼"

$R_{min}$=10 pixels

| $R_{actual}$ | dR |
|---|---|
| $R_{min}$ | $R_{min}$ |
| $R_{max}$ | 0 |
| 30 pixels | 7.78 pixels |

Figure 10:
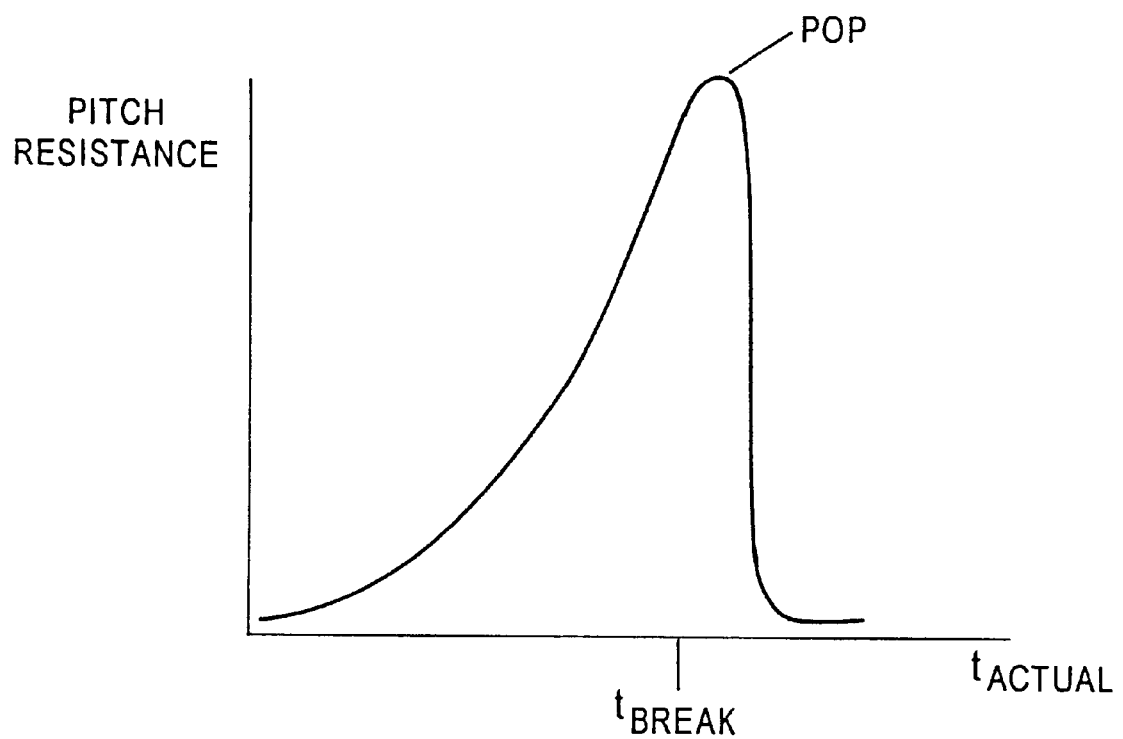
FIG. 10 is a graph showing an exemplary function relating a sound property, such as pitch, or resistance feedback to a user as a function of deformation as a membrane is deformed of the breaking point.

FIG. 10 is a graph showing an exemplary function relating a sound property, such as pitch, or resistance feedback to a user as a function of deformation as a membrane is deformed to the breaking point. It is desirable to provide an audio feedback to a user so the user can get a sense of the progress the deformation is making towards the breaking point. Preferably, this is presented to the user as a tone which rises in pitch from a low value toward a relatively high value until the breaking point $T_{break}$ is reached. Upon the breaking of the membrane, the tone will revert to the low value rather suddenly to provide feedback for the next layer. At the breaking point, preferably the tone at the breaking point is accompanied by a pop sound which indicates that the membrane has broken.

Note that the graph used in FIG. 10 is also appropriate for indicating the magnitude of resistance to user pressure encountered when using a tactile feedback device such as a haptic device which permits motion in three-dimensions, for example in the XY plane of a flat surface such as a table and in a depth direction perpendicular to the XY plane. As the membrane is deformed toward the breaking point ($T_{break}$), the resistance encountered by the user in pressing on the haptic device increases as it would when pressing upon a normal membrane. The more you attempt to deform the membrane, the more resistance one encounters up until the membrane breaks. At that point, the resistance experienced by the user is somewhat abruptly reduced to a low value until the user encounters the next membrane for penetration. The breaking of the membrane is accompanied by an animation showing the bursting of the window layer being penetrated.

Figure 11:
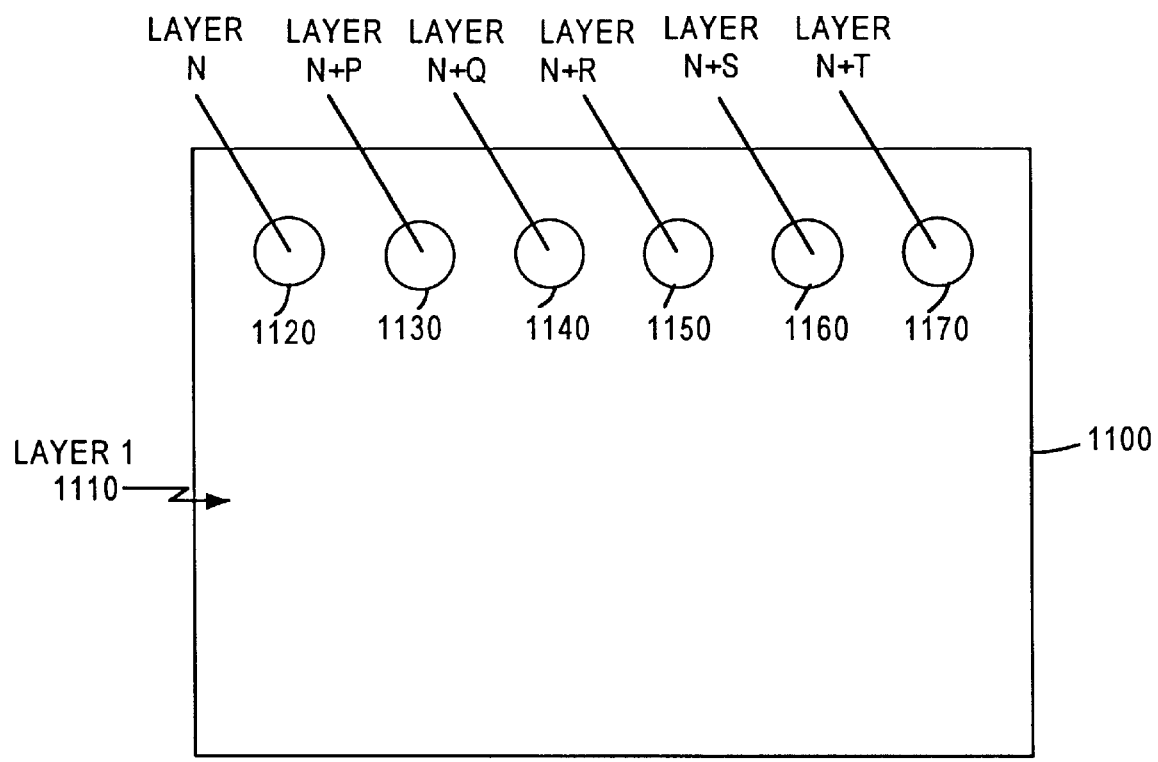
FIG. 11 illustrates a screen display having worm holes permitting direct access to different layers of a multiple layer stack of window layers or image planes.

FIG. 11 illustrates a screen display having worm holes permitting direct access to different layers of a multiple layer stack of windows or image planes. FIG. 11 essentially shows a display screen from which one desires to access a plurality of overlapping layers. Layer 1, the uppermost layer, is shown at item 1110. Q layers are in the stack where Q is greater than N+T. A plurality of worm holes are shown with the worm hole penetrating to a certain layer level. For example, hole 1120 goes directly to layer N. Worm hole 1130 goes directly to layer N+P, worm hole 1140 goes to layer N+Q and so on through hole 1170. In the example shown, the numbers N, P, Q, R, S and T are progressively larger than the preceding number; in other words, each of worm holes 1120 through 1170, in the examples shown, go progressively deeper into the stack plural layers. By creating these worm holes, a user may position a cursor within the hole, click on the cursor and have the layer at the bottom of the hole become the active or topmost layer on the screen. In this way, not unlike an elevator which goes only to floors 45 and above in a skyscraper, one can access certain portions of the stack in an expedited fashion.

Figure 12:
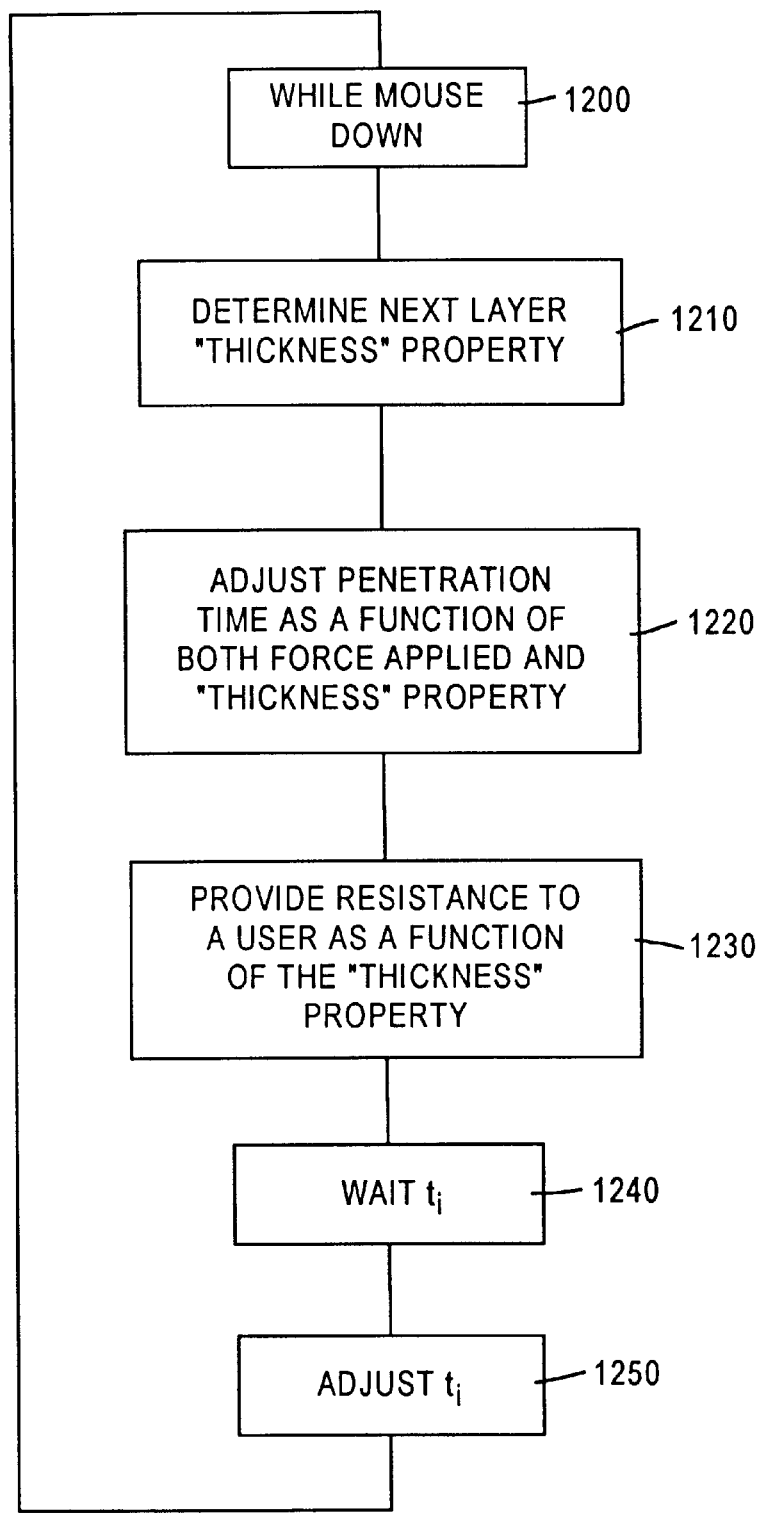
FIG. 12 is a flow chart of an exemplary process for using an input/output device which can detect the amount of force applied and provide tactile feedback to a user when passing through a membrane layer.

FIG. 12 is a flow chart of an exemplary process for using an input/output device which detects an amount of force applied by the user and provides tactile feedback to a user when passing through a membrane layer. While a mouse button is down (1200) or the cycling function is otherwise activated, the thickness of the next layer is determined (1210) and the penetration time associated with a given layer is adapted as a function of both the force applied by the user and the thickness property (1220). The amount of resistance provided to a user through tactile feedback is a function of the thickness property of the layer (1230). Blocks 1240 and 1250 correspond to blocks 730 and 740, respectively of FIG. 7 and are utilized the same way. In this way, a user, by applying more force, can pass through a layer of a given thickness in a faster time by applying more force.

Although the examples shown have been discussed with respect to moving from a topmost layer deeper into a stack of stacked layers, it is also possible to back out from a certain point in a stack of layers. Preferably, this is done by activating a key such as a shift or a function key which will reverse the direction of motion. When going from one layer to a previous layer, all aspects of the animation should be reversed. That is, one would expect the pitch of the sound which accompanies bursting through a layer, as illustrated in FIG. 10, to be reversed so that it runs from the righthand extreme of the $T_{actual}$ axis back toward the origin. That means that the sound will begin with a low pitch, rise very rapidly to the high pitch the $T_{break}$ point then slowly lower in pitch as the reverse animation goes toward the origin. Even the pop sound can be reversed to provide a distinctive "unpop" sound. Thus, preferably the sounds associated with breaking through a membrane should have direction so that the forward and reverse presentation of those sounds as $T_{actual}$ changes will be audibly distinct. By the same token, also with respect to FIG. 10, the resistance applied to a haptic device when backing out of a layer previously broken through will be essentially that shown in FIG. 10, however being traversed from the righthand extreme of $T_{actual}$ toward the origin. Similarly, the pixel transformations associated with the unbreaking of the membrane will start at a displacement value of $T_{break}$ (shown, for example in FIG. 9C), and progress through the intermediate values back through the point where there is no distortion of the membrane, for example as shown in FIG. 9A. In this way, one may traverse both through a series of layers in a forward direction and back out in order to ensure that the layer receiving the most prominents on the screen at a given point in time is one selected by the user.

Figure 13:
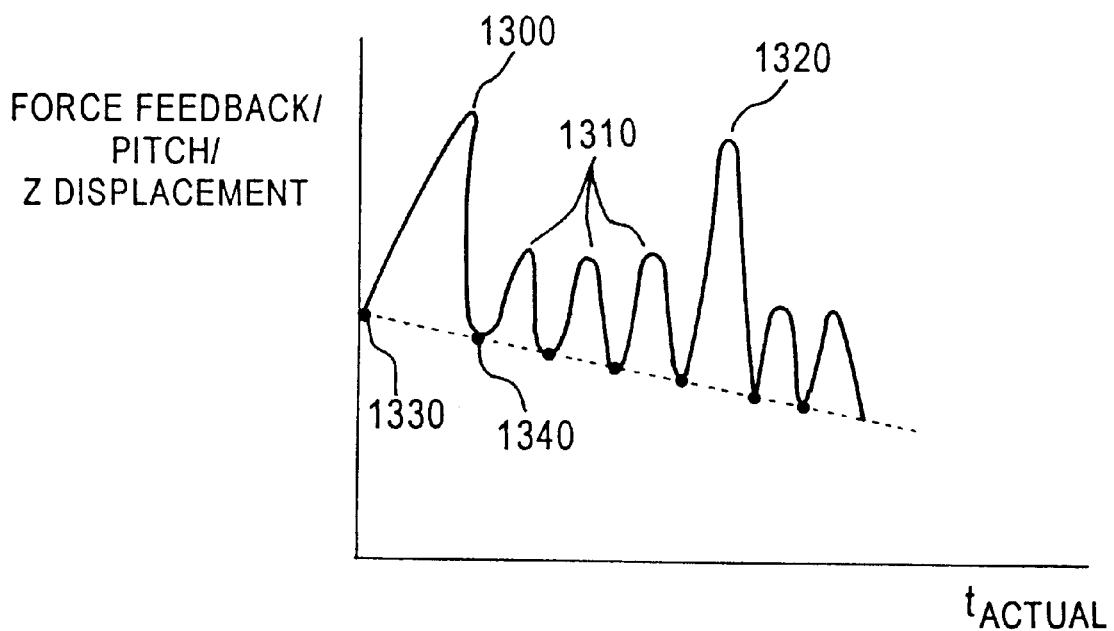
FIG. 13 is a graph representing a user experience when using a force sensing tactile feedback input/output device when passing through a plurality of window layers of various thickness.

FIG. 13 is a graph representing a user experience when using a force sensing tactile feedback input/output device when passing through a plurality of window layers or image planes of varying thicknesses. The ordinate in this graph reflects three quantities separately. First, it represents the amount of force feedback. Second the value of the pitch of an audio feedback and third the Z displacement of a haptic device as layers are traversed. In keeping with the multilayer metaphor, as $T_{actual}$ increases, the user will traverse through a plurality of layers. Layers 1300 and 1320, represented by high peaks on the force feedback scale (which is substantially the same in shape as the curve followed by the pitch of the audio feedback), represent the breaking point for the relatively thick layers. As each layer 1300 and 1320 is broken through, the resistance experienced by user is reduced to a lower value. The plurality of dots shown at 1330 are referenced with respect to a Z displacement. Starting out, prior to traversing any layers, the Z displacement is at some neutral value 1330. As the user breaks through each layer, the haptic device drops a little bit as shown by the successive points 1340 giving the user the feeling of progressing deeper into the multilayer stack. When the user breaks through a layer illustrated by the force peak at 1300, a plurality of subsequent layers 1310 which have a thinner property than layers 1300 and 1320 are encountered. These are broken through with less effort and therefore have less force feedback sent back to the user. The tactile feedback and the accompanying audio feedback can permit a user to navigate through multilayer spaces with great ease and facility and in ways which overcome the problems of the prior art. Thus, a user can quickly identify and bring a desired layer to the foreground for detailed consideration regardless of the number of layers, translucent or otherwise, above it.

Although the present invention has been described and illustrated in detail, it is clearly understood that the same is by way of illustration and example only and is not to be taken by way of limitation, the spirit and scope of the present invention being limited only by the terms of the appended claims and their equivalents.

What is claimed is:

1. Apparatus for navigating through a plurality of overlapping display planes, comprising:
   a. a display;
   b. a display interface for controlling said display; and
   c. a computer device configured to provide a graphical user interface using said display interface, and to provide a user with selective access to a desired one of stacked display planes in response to user action constituting selection of a window cycle mechanism and to activation of the window cycle mechanism to reveal a different display plane,
   in which said user action comprises placing a cursor over a non-reactive portion of a screen display.

2. Apparatus of claim 1 in which said activation comprises one of a mouse click or a command.

3. Apparatus of claim 1 in which said activation comprises holding a user activated control in one position and while the control is in that position, cycling stacked display planes so that different display planes receive most prominence in a predefined sequence on the display.

4. Apparatus of claim 3 in which a rate of cycling stacked display planes changes based on the length of time said user activated control is in said one position.

5. Apparatus of claim 4 in which a rate with which the rate of cycling changes can be set by a user.

6. Apparatus of claim 4 in which an initial rate of cycling can be set by a user.

7. Apparatus of claim 3 in which each display plane has a property analogous to thickness which affects the amount of time a display plane receives the most prominence during cycling.

8. Apparatus for navigating through a plurality of overlapping display planes, comprising:
   a. a display;
   b. a display interface for controlling said display; and
   c. a computer device configured to provide a graphical user interface using said display interface, and to provide a user with selective access to a desired one of stacked display planes in response to user action constituting selection of a window cycle mechanism and to activation of the window cycle mechanism to reveal a different display plane,
   in which at least one of said display planes is represented in a way which emulates an elastic membrane.

9. Apparatus of claim 8 in which navigating through said display plane is represented as an animation in which image information on said display plane is modified to appear to follow distortion an elastic membrane would experience when being penetrated.

10. Apparatus of claim 9 in which said display plane is replaced with a different display plane in terms of relative prominence when the distortion which said elastic membrane would experience reaches an elastic limit.

11. Apparatus of claim 9 in which a sound which changes with the amount of said distortion accompanies said animation.

12. Apparatus of claim 8 in which modifying said image information includes mapping image pixels from said image plane to locations approximating positions they would occupy if the image plane were elastic and if the image plane were distorted in the process of penetration.

13. Apparatus of claim 12 in which the mapping of pixels comprises moving pixels in a radial direction toward a cursor location.

14. Apparatus of claim 13 in which an amount by which an individual pixel is moved is a function of its distance from a cursor location.

15. Apparatus of claim 8, further comprising a force feedback input/output device.

16. Apparatus of claim 15 in which each display plane has a property analogous to thickness which affects the amount of force needed to be applied to on said input/output device to pass through to the next layer.

17. Apparatus of claim 16 in which said property affects the amount of time a display plane receives the most prominence during cycling.

18. Apparatus of claim 15 in which the amount of resistance provided to a user through said force feedback input/output device is a function approximating that experienced when force is applied to the surface of an elastic membrane.

19. Apparatus of claim 18 in which vertical displacement of said force feedback input/output device changes as each layer is penetrated.

20. Apparatus of claim 8 in which navigating through said display plane is represented as an animation in which image information on said display plane is modified to appear to burst like a membrane when being penetrated.

21. Apparatus for navigating through a plurality of overlapping display planes, comprising:
   a. a display;
   b. a display interface for controlling said display; and
   c. a computer device configured to provide a graphical user interface using said display interface, and to provide a user with selective access to a desired one of stacked display planes in response to user action constituting selection of a window cycle mechanism and to activation of the window cycle mechanism to reveal a different display plane,
   in which said user action comprises placing a visual indicator over an entrance to one or more worm holes providing direct access to a layer not at the top of said stack and said window cycle mechanism comprises activating a user activated control while over said worm hole to cause said layer not at the top of said stack to be displayed with emphasized prominence.

22. A method of navigating through multiple layers of overlapping display planes, comprising the steps of:
   a. positioning a visual element over an otherwise non-reactive portion of a display plane;
   b. activating a user activated control; and
   c. changing prominence with which a display plane is displayed in relation to other layers in response to activation of said user activated control.

23. The method of claim 22 in which changing the prominence permits access to functionality associated with said display plane.

24. A method of navigating through multiple layers of overlapping display planes, comprising the steps of:
   a. cycling through said multiple layers one layer at a time; and
   b. reducing the time between cycles as a function of an amount of time cycling has been underway.

25. A method of navigating through multiple layers of overlapping display planes, comprising the step of:
   a. placing a visual indicator over an entrance to a worm hole providing direct access to a layer not at a top of said stack; and
   b. activating a user control while over said worm hole to cause a layer not at the top of said stack to be displayed with emphasized prominence.

26. A computer program product, comprising:
   a. a memory medium; and
   b. a computer program stored on said memory medium, said computer program comprising instructions for permitting a user to position a visual element over an otherwise non-reactive portion of a display plane displayed on a display; and when a user activates user activated control, changing the prominence with which a display plane is displayed in relation to other layers.

27. A computer program product, comprising:
   a. a memory medium; and
   b. a computer program stored on said memory medium, said computer program comprising instructions for cycling through said multiple layers each comprising one image plane one layer at a time for displaying one layer with emphasized prominence; and reducing the time between cycles as a function of the amount of time cycling has been underway.

28. A computer program product, comprising:
   a. a memory medium; and
   b. a computer program stored on said memory medium, said computer program comprising instructions for permitting a user to place a visual indicator over an entrance to a worm hole providing direct access to an image plane not at the top of a stack of image planes and activating a user control while over said worm hole to cause an image plane not at the top of said stack to be displayed with emphasized prominence.

* * * * *